United States Patent [19]

Genik-Sas-Berezowsky

[11] 4,018,595
[45] Apr. 19, 1977

[54] PRODUCTION OF COPPER BY GASEOUS REDUCTION

[75] Inventor: Roman Michael Genik-Sas-Berezowsky, Edmonton, Canada

[73] Assignee: Sherritt Gordon Mines Limited, Ontario, Canada

[22] Filed: Nov. 28, 1975

[21] Appl. No.: 636,327

[52] U.S. Cl. .................................. 75/.5 A; 75/108; 75/109; 75/117

[51] Int. Cl.[2] ..................... C22C 1/04; C22B 1/10; C22B 15/00

[58] Field of Search ............... 75/.5 A, .5 AA, 109, 75/117, 108, 115, 121; 148/105

[56] References Cited

UNITED STATES PATENTS

| | | | |
|---|---|---|---|
| 2,836,485 | 5/1958 | Schaufelberger | 75/.5 A |
| 3,669,643 | 6/1972 | Bagley et al. | 75/.5 AA |
| 3,694,185 | 9/1972 | Kunda et al. | 75/.5 A |
| 3,756,866 | 9/1973 | Parker et al. | 148/105 |
| 3,833,351 | 9/1974 | Neskora et al. | 75/.5 A |

Primary Examiner—Walter R. Satterfield
Attorney, Agent, or Firm—Frank I. Piper; Arne I. Fors; Robert F. Delbridge

[57] ABSTRACT

An improvement in the process of producing substantially oxide free copper from copper salts by reacting an acidic aqueous solution which contains the copper salts with a reducing gas at elevated temperature and pressure to precipitate metallic copper. The improvement for producing copper in free-flowing powder form comprises providing in the aqueous solution a finite amount of an addition agent selected from the group consisting of polymeric polyamine compounds having amino groups linked by alkyl groups having 2 to 4 carbon atoms.

6 Claims, No Drawings

PRODUCTION OF COPPER BY GASEOUS REDUCTION

This invention relates to the recovery of copper from aqueous systems in which it is present as a salt by reacting the system with a reducing gas at elevated temperature and pressure. More particularly, it is concerned with improvements in such processes whereby the physical and chemical characteristics of the copper powder produced by direct hydrogen reduction from acid sulphate solutions is controlled through use of an organic addition agent selected from the group consisting of polymeric polyamines having amino groups linked by alkyl groups having 2 to 4 carbon atoms.

Processes are known and in commercial use by which copper, nickel and cobalt, as well as other metals having an oxidation-reduction potential of between that of silver and cadmium inclusive are precipitated in the form of finely divided elemental metal particles of random shape and size from solutions or slurries in which the metal is present as a salt by reacting the solution or slurry with a sulphur-free reducing gas at elevated temperature and pressure. This method of producing metal by gas reduction from solutions and slurries in which the desired metals are present as compounds has been subjected to exhaustive investigation leading to the discovery of operating conditions, catalysts, promoters and additives by means of which optimum results can be obtained in the large scale commercial operation of the process. However, problems remain in the production of metals, and particularly in the production of copper, from solutions by gas reduction especially where acid sulphate solutions are involved and it is desired to produce metal of high purity on a continuous basis.

In the commercial scale production of copper and other metal powders by the prior art gas reduction procedures, the process is carried out on a batch basis. In this procedure, a fixed volume of metal bearing solution is charged into a pressure vessel such as an autoclave, the vessel is sealed and the solution heated and reacted with hydrogen. After completion of the reduction reaction, the metal depleted solution is discharged and the whole procedure is repeated again. The powder product may be discharged after each reduction or, as is usually the case in the commercial scale production of cobalt and nickel, powder particles precipitated in the initial and subsequent reductions are left in the reaction vessel until a large number, e.g. up to 50 or more, separate batches of feed have been reduced. It will be apparent to those skilled in the art that it would be economically advantageous to operate the reduction process on a continuous basis. However, serious problems are encountered, particularly with copper reduction, in carrying out the direct hydrogen reduction of metals from solution on a continuous basis. One serious problem is the agglomeration of particles and/or plastering or plating of metal on the interior walls of the reaction vessel and/or on the agitator and other internal fittings. This, of course greatly complicates the discharging of the reaction vessel upon completion of a reduction cycle and also results in lost production since metal plated on the reaction vessel must be removed periodically by mechanical methods and/or chemical leaching. Also, the pebble-like agglomerates tend to entrain unreacted solution impurities and oxides which have not been reduced to metal.

The problem of plastering and agglomeration is particularly acute in the production of copper which precipitates very rapidly from solution upon reaction with hydrogen at elevated temperature and pressure. The problems of plastering and agglomeration have been overcome to some extent, particularly insofar as nickel and cobalt reductions are concerned, by the use of small amounts of certain additives in the reduction feed solution. One such additive is an ethylene maleic anhydride polymer as described in U.S. Pat. No. 3,694,186 issued Sept. 26, 1972. Other useful addition agents are acrylic and polyacrylic acids, polymers and copolymers, derivatives and salts of acrylic and polyacrylic acids, compounds which contain acrylic and polyacrylic acids and polymers, derivatives and salts of acrylic and polyacrylic acids, lignin and derivatives of lignin as described in U.S. Pat. No. 2,853,380 issued Sept. 23, 1958. Higher fatty acids and salts thereof and compounds containing higher fatty acids and salts thereof are also known as additives for reducing reactions as is described in U.S. Pat. No. 2,740,708 issued Apr. 3, 1954.

While the aforementioned prior art additives serve very useful purposes in the recovery of metals by direct reduction from aqueous solutions, their usefulness is largely limited to ammoniacal systems. The prior additives do not appreciably reduce plastering or plating of the reduced metal in acid systems. Also, the low apparent density and irregular particle shape of the powders produced with use of the prior art additives create powder handling and washing problems and such powders are more readily oxidizable. Still another problem is that the prior art additives tend to introduce high levels of contamination by carbon and by entrainment of metals and sulphur in the irregular-shaped particles.

An important object of the present invention is to avoid these and other problems of the prior art methods while providing an improved method for the production of copper from aqueous acid sulphate systems by reacting the system with hydrogen at elevated temperature and pressure whereby agglomeration of copper particles and their plastering on the walls of the reaction vessel are substantially minimized and the physical characteristics, e.g. especially flowability, of the copper powder product are substantially improved.

Another object of the invention is to control, through the use of additives, the powder characteristics of copper powder precipitated by direct hydrogen reduction from aqueous acid sulphate solutions such that the reduction process can be carried out on a continuous or semi-continuous basis rather than on a batch basis.

According to the invention, there is provided in the solution subjected to the reduction reaction a finite amount of an addition agent consisting of a polymeric polyamine compound having amino groups linked by alkyl groups having 2 to 4 carbon atoms. The preferred additive agents are polyethylenimines having a molecular weight in the range of 40,000 to about 100,000.

Although it is not clear how or why the polyamine additives affect the copper compound reduction mechanism, they do, in fact, produce a number of beneficial results. The presence of the additive enables the growth or development as densification proceeds of copper powder composed of regular-shaped, dense, compact dodecahedral-like particles; the tendency for the particles to become agglomerated and/or to plate on the reaction vessel walls is significantly decreased by virtue of the high apparent density (3–4.5 gm/cm$^3$) of the powder product; product collection is greatly facilitated; the additive compound remains dissolved in the reduction solution and does not become entrained in the powder particles so that contamination by carbon is minimal - regardless of additive level; the compact, uniform particle shape also results in minimal entrainment of water soluble impurities such as Zn, Mg, Fe and S which may be present in the reduction solution and, finally, because of the same quality, the powders are much less prone to oxidation, e.g. during washing and drying etc., than the more irregular-shaped prior art particles.

The method of the invention is independent of the source of the copper bearing acid sulphate system. Usually, such system will be a solution derived from conventional aqueous sulphuric acid or ammoniacal ammonium sulphate leaching methods with solutions of the latter type being acidified with $H_2SO_4$ prior to reduction. The copper normally will be dissolved in the solution but in some cases a portion of the contained copper may be present, at least initially, as a solid salt. In addition to copper, the solution may also contain sulphates of other metals such as nickel, cobalt, iron, zinc and sodium. The method of the present invention may be used in conjunction with any of the specific processes which are known for the production of metals from solutions by gas reduction. Such methods are described in detail in numerous patents including, for example, Canadian Pat. Nos. 520,266, 553,400, 553,399 and 553,312.

Generally, reduction and precipitation of copper from acid sulphate systems in which it is present as a dissolved metal sulphate or partly as dissolved sulphate and partly as solid sulphate such as basic copper sulphate, preferably is conducted at an elevated temperature of the order of from about 90° C. to about 260° C. and preferably within the narrower range of about 140° C. to about 160° C. and under a positive partial pressure of reducing gas such as hydrogen within the range of from about 100 to 600 pounds per square inch and preferably within the narrower range of from about 200 to about 500 pounds per square inch. The conditions of operation, such as the metals concentration, ammonium sulphate concentration, hydrogen in concentration, temperature, partial pressure of hydrogen and total pressure by which optimum reduction is obtained, will vary depending on the source of the copper bearing solution and the type of equipment used. The amount of metal in the system is not critical. Copper concentration may vary from 10–150 g.p.l. but preferably is about 40 to 100 g.p.l. which is the range within which the process normally can be conducted as an economically practical operation.

We have found that control over the physical characteristics of the precipitated metal powders produced by this direct reduction process can be obtained when as little as 5 parts per million of polyamine additive is provided in the system subjected to the reduction reaction.

The preferred additive is the highly branched polyethylenimine polymer produced by the acid-catalyzed polymerization of the monomer, ethylenimine. According to information contained in the technical publications of the Dow Chemical Company, a commercial supplier of polyethylenimine derivatives, the polyethylenimine polymer is believed to be composed of units which have 2 carbons per nitrogen and these units are randomly distributed in the approximate ratios of one primary amino-nitrogen/two secondary amino nitrogens/one tertiary amino nitrogen.

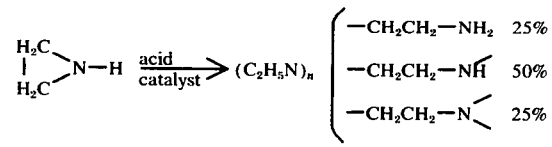

The preferred polyethylenimine polymers have molecular weights in the range of 40,000 to about 100,000. These polymers are highly water soluble and can be added directly to the reduction solution or as a pre-dissolved solution.

In most cases, optimum results are obtained with additions of between 100 to 200 ppm of the preferred additive compounds. For example, increasing the amount of polyethylenimine additive beyond 500 ppm apparently produced no additional beneficial effect as compared to the smaller amounts. The additive is not consumed during the reduction reaction so where reduction end solution is recycled, for example, for stripping metal from a loaded organic solvent extractant, it is not necessary to provide additive for each new batch of reduction solution except to compensate for mechanical and other minor losses.

Use of the additive compounds according to the present invention has the important advantage of enabling the direct reduction of copper to be carried out on a continuous basis rather than as the normal batch reduction type operation. That is, because of the anti-plastering effect of the additive and, also, because of the relatively high density and the excellent settling and handling properties of the powder product, it is possible to continuously feed solution to the pressure vessel, continuously reduce metal from solution and continuously remove metal powder product in a manner which is not possible without the use of the additive. It should be understood that as used herein "continuous reduction" is intended to include both continuous and intermittent feeding and/or discharge or a reaction vessel in which the hydrogen reduction conditions are continuously maintained as contrasted with "batch reductions" in which reduction conditions are not maintained during charging and discharging of the reduction vessel.

The following examples illustrate the results which are obtainable by the use of the present invention. Some compounds are identified by trade names under which the substances are available. Of the substances employed in the following examples, "Acrysol A-3" is a polyacrylic acid of molecular weight less than 150,000 sold by Rohm & Haas Co. "PEI* 400, PEI* 600, PEI* 1000" etc. are commercially available polyethylenimine polymers sold by Dow Chemical Company.

* PEI is a trade mark of Dow Chemical Company.

EXAMPLE 1

A number of batch reductions were carried out in a one-gallon titanium-lined autoclave equipped with titanium internal fittings including a marine-type impeller-agitator. The feed solution was a synthetic acid sulphate leach solution prepared from reagent grade chemicals and which analyzed (g.p.l.) 69.8 Cu, 21.2 Zn, 7.45 Mg, 1.23 Fe, 1.34 Ni, 60.0 $H_2SO_4$. For each reduction, 2.5 liters of this solution were charged into the autoclave. In one test, no additive was used, in another test, Acrysol A-3 was added in accordance with the prior art and in two further tests, 200 ppm of a different additive compound was added to each charge according to the invention. Each batch was heated under 350 p.s.i. hydrogen overpressure to 163° C. and held at temperature for 10 minutes, cooled and discharged. The metal powder products were given two dislacement washes with 10 g.p.l. $H_2SO_4$ solution, two with water and then one with acetone. The results are reported in Table I. It can be seen that in the absence of any additives, the product was in the form of coarse balls and heavy plastering on the walls and other internals of the reduction autoclave. Addition of Acrysol A-3 decreased plastering but produced a non-flowing powder of low apparent density. It can be observed also that the Acrysol addition resulted in a much higher level of impurities than is obtained with no additive or with PEI*.

compound of the invention was used. The results which are shown in Table II show that each of the additives is effective to produce free flowing powders of relatively high apparent density with the higher molecular weight additives producing powders with a smaller particle size than the lower molecular weight additives.

TABLE II

Chemical Assays and Physical Properties of Copper Powder

| Additive | Additive Molecular Weight | Final Copper Filtrate (g.p.l.) | Final Copper Powder (g) | Impurities in Copper Powder (ppm) Zn | S | C | Apparent Density (g/cc) | Flow Rate (sec/50 g) | Tyler Screen (mesh) Cumulative % Passing 100 | 200 | 325 |
|---|---|---|---|---|---|---|---|---|---|---|---|
| PEI-1000 | 50–100,000 | 13.9 | 129 | 5 | 26 | 42 | 3.10 | 37.0 | 99.5 | 75.4 | 26.1 |
| PEI-600 | 40–60,000 | 18.5 | 127 | 4 | 16 | 47 | 2.93 | 22.9 | 100 | 73.9 | 29.3 |
| PEI-400 | 30–40,000 | 16.3 | 135 | 4 | 17 | 37 | 2.81 | 24.8 | 99.9 | 81.4 | 31.3 |
| PEI-18 | 1800 | 15.6 | 134 | 7 | 30 | 26 | 2.80 | 28.8 | 45.4 | 11.8 | 1.5 |
| PEI-12 | 1200 | 20.5 | 117 | 6 | 21 | 24 | 2.62 | 32.5 | 39.2 | 8.7 | 0.7 |
| PEI-6 | 600 | 17.4 | 125 | 5 | 11 | 29 | 2.73 | 31.0 | 40.0 | 8.5 | 0.5 |
| K&K PPI* | n.a. | 15.1 | 120 | 5 | 12 | 25 | 2.63 | 33.0 | 22.8 | 3.7 | 0.3 |

*polypropylenimine of unspecified molecular weight from K&K Laboratories

EXAMPLE 3

In this example, the same procedures were followed as in Example 1 except that only one type of polyethylenimine additive was employed and the quantity of additive was varied for each run. The results are reported in Table III and show that even at levels as low as 5 ppm, the additive is quite effective, although the preferred range of additive for producing fine, free-flowing powder is 100–200 ppm. The results also show little additional benefit from levels of additive above 200 ppm.

TABLE III

Chemical Assays and Physical Characteristics of Copper Powder

| Additive Level (ppm) | Final Copper Filtrate (gpl) | Final Copper Powder (g) | Impurities in Copper Powder Zn | S (ppm) | C | Apparent Density (g/cc) | Flow Rate (sec/50 g) | Tyler Screen (mesh) Cumulative % Passing 100 | 200 | 325 |
|---|---|---|---|---|---|---|---|---|---|---|
| 500 | 18.4 | 115 | 3 | 18 | 50 | 3.17 | 21.1 | 100 | 77.8 | 32.8 |
| 200 | 13.9 | 129 | 5 | 26 | 42 | 3.10 | 32.2 | 99.5 | 75.4 | 26.1 |
| 100 | 17.4 | 117 | 3 | 19 | 45 | 2.77 | 29.0 | 94.8 | 52.8 | 20.0 |
| 25 | 15.0 | 110 | 3 | 18 | 24 | 2.63 | 24.0 | 50.6 | 14.4 | 2.6 |
| 10 | 15.6 | 111 | 5 | 25 | 19 | 2.87 | no F.R. | 67.2 | 33.0 | 12.8 |
| 5 | 17.4 | 118 | 5 | 31 | 25 | 2.94 | 31.0 | 56.4 | 18.2 | 2.6 |

TABLE I

Assays and Physical Characteristics of Copper Products

| Additive | Level (ppm) | Final Copper Distribution Filtrate (gpl) | Powder (g) | Impurities in Copper Products (ppm) Fe | Zn | Ni | Mg | S | C | Apparent Density (g/cc) | Flow Rate (sec/50g) | Remarks |
|---|---|---|---|---|---|---|---|---|---|---|---|---|
| None | — | 9.6 | — | 19 | 37 | 17 | 15 | 88 | 38 | N.M.** | No F.R. | Heavy plastering and coarse balls |
| Acrysol A-3 | 200 | 19.2 | — | 84 | 40 | 8 | 18 | 200 | 355 | 0.8 | No F.R. | Light plastering on autoclave walls and internals |
| PEI 1000 | 200 | 13.9 | 129 | 10 | 5 | 3 | 3 | 26 | 42 | 3.10 | 32.2 | Less than 5% plastering*, 75.4% minus 200 mesh powder |
| PEI 600 | 200 | 18.5 | 127 | 12 | 4 | 9 | 2 | 16 | 47 | 2.93 | 22.9 | Less than 5% plastering*, 73.8% minus 200 mesh powder |

*In the PEI tests, the autoclave walls were clean with the only plastering occurring on agitator and thermowell
**Not measurable

EXAMPLE 2

The procedure of Example 1 was repeated except that for each reduction, 200 ppm of a different additive

EXAMPLE 4

In this example, the same procedure as in Example 1 was followed except that the initial solution was actual purified oxidation leach liquor analyzing (g.p.l. 83.2

Cu, 19.5 Zn, 0.25 Fe, 14.3 H₂SO₄ and only one additive (PEI-600) was used; the initial acidity was varied in tests 1, 2, and 3 while in test 4, 150 g.p.l. of ammonium sulphate was added. The results appear in Table IV and show that variation of the initial acidity did not appreciably affect the reduction reaction or powder characteristics. Also, the addition of $(NH_4)_2SO_4$ to the acid systems resulted in much finer powder.

TABLE IV

| | Parameters | | Final Copper Distribution | | | Chemical Assays and Physical Characteristics of Copper Powder | | | | | | | | |
|---|---|---|---|---|---|---|---|---|---|---|---|---|---|---|
| | Initial | | | | | Impurities in Copper Powder (ppm) | | | | Apparent | Flow | Tyler Screen (mesh) Cumulative % Passing | | |
| No. | $H_2SO_4$ (gpl) | $(NH_4)_2SO_4$ (gpl) | Filtrate (gpl) | Powder (g) | Plaster (g) | Zn | Ni | S | C | Density (g/cc) | Rate (sec/50g) | 100 | 200 | 325 |
| 1 | 14 | 0 | 14.8 | 136 | 17 | 2 | 3 | 20 | 30 | 3.28 | 22.5 | 100 | 67.8 | 22.4 |
| 2 | 25 | 0 | 17.7 | 119 | 22 | 2 | 3 | 9 | 21 | 4.10 | 17.0 | 100 | 72.8 | 4.2 |
| 3 | 50 | 0 | 22.8 | 120 | 6 | 3 | 3 | 16 | 29 | 3.47 | 20.8 | 94.4 | 72.2 | 30.2 |
| 4 | 50 | 150 | 13.2 | 145 | 9 | 2 | 3 | 9 | 36 | 3.38 | 19.0 | 99.8 | 77.0 | 50.8 |

Additive: 100 ppm of PEI-600

EXAMPLE 5

In this test, the reduction reaction was carried out on a continuous basis with feed solution being continuously fed into the reduction vessel and product powder being intermittently discharged from the reduction vessel. The reduction temperature was maintained at 160° C. and the hydrogen partial pressure was maintained at 325 psi (about 400 psi total pressure)

A run was conducted for 24 hours using solution obtained from the aqueous acid oxidation of copper sulphide concentrate. The solution analyzed (g.p.l.) 67.3 Cu, 6.25 Fe, 17.1 Zn, 4.77 Mg, 13.8 H₂SO₄. The results are shown in Tables V and VI.

TABLE V

Copper Winning by Hydrogen Reduction: 24 Hours Continuous
Conditions: 160° C., 325 psi H₂ p.p., 100 ppm PEI-1000

| Time (hours) | Total Volume of Feed Solution (liters) | Residual Cu in End Soln. (gpl) | Copper Product Collected | | Distribution (%) |
|---|---|---|---|---|---|
| | | | Samples (grams) | Totals (grams) | |
| 0.83 | 5 | 22.5 | 40 | 40 | |
| 1.92 | 10 | 22.5 | 225 | 265 | |
| 2.75 | 15 | 22.0 | 233 | 498 | |
| 8.95 | 20 | 19.0 | 241 | 739 | |
| 5.00 | 25 | 20.0 | 168 | 907 | |
| 5.92 | 30 | 22.5 | 177 | 1084 | |
| 6.75 | 35 | 23.0 | 209 | 1293 | |
| 7.67 | 40 | 22.0 | 180 | 1473 | |
| 8.50 | 45 | 24.0 | 217 | 1690 | |
| 9.75 | 50 | 24.0 | 210 | 1900 | |
| 10.67 | 55 | | 400 | 2300 | |
| 11.50 | 60 | 23.5 } 24.0 | | | |
| 12.67 | 65 | | 308 | 2608 | |
| 13.17 | 70 | 25.0 } 25.0 | | | |
| 14.00 | 75 | | 426 | 3034 | |
| 14.92 | 80 | 25.0 } 24.0 | | | |
| 15.75 | 85 | | 463 | 3497 | |
| 16.67 | 90 | 25.0 } | | | |
| 17.50 | 95 | | 428 | 3925 | |
| 18.42 | 100 | 24.0 } | | | |
| 19.25 | 105 | | 372 | 4297 | |
| 20.17 | 110 | 24.0 } | | | |
| 21.00 | 115 | | 370 | 4667 | |
| 21.50 | 120 | 25.0 } | | | |
| 22.67 | 125 | | 377 | 5044 | |
| 23.50 | 130 | 24.0 } | | | |
| 24.00 | 132 | | 123 | 5167 | 89.3 (Powder) |
| | Plastering and Plating | | 618 | 5785 | 10.7 (Plastering and Plating) |

The results show that with the addition of 100 ppm of polyethylenimine polymer to the reduction feed solution, it was possible to carry out the reduction reaction on a continuous basis for 24 hours with 89.3% of the reduced copper being recovered as a free flowing, dense powder and only 10.7% of the reduced copper being plated or plastered on the reaction vessel internals.

TABLE VI

Copper Winning by Hydrogen Reduction: 24-Hour Continuous Run Copper Powder Physical Properties

| Time (hours) | Product Weight (grams) | Apparent Density (g/cc) | Flow Rate (sec/50g) | Physical Properties of Powder Tyler Screen Size (mesh) | | | | | |
|---|---|---|---|---|---|---|---|---|---|
| | | | | 48/100 | 100/150 | 150/200 | 200/250 | 250/325 | −325 |
| 1.92 | 265 | 4.50 | 14.1 | 0.6 | 1.5 | 13.4 | 14.8 | 54.9 | 14.8 |
| 3.95 | 474 | 4.61 | 14.0 | 1.6 | 26.7 | 49.6 | 5.1 | 12.4 | 4.6 |
| 6.75 | 554 | 4.51 | 16.2 | 20.2 | 20.4 | 29.7 | 2.6 | 10.6 | 16.5 |
| 11.5 | 1007 | 4.55 | 15.2 | 25.2 | 19.4 | 28.5 | 3.2 | 10.1 | 13.6 |
| 16.67 | 1197 | 4.62 | 15.7 | 32.5 | 21.8 | 20.5 | 2.8 | 13.4 | 9.0 |
| 20.17 | 800 | 4.35 | 16.0 | 27.1 | 26.5 | 24.1 | 2.6 | 11.5 | 8.2 |
| 21.50 | 870 | 4.43 | 16.2 | 37.0 | 20.7 | 18.5 | 2.4 | 13.8 | 7.6 |
| 23.5 | 377 | 4.37 | 16.4 | 34.5 | 26.3 | 23.7 | 2.2 | 8.8 | 4.5 |
| 24.0 | 123 | 4.11 | 18.4 | 46.2 | 36.1 | 12.0 | 1.3 | 1.8 | 2.6 |

What I claim as new and desire to protect by Letters Patent of the United States is:

1. In combination with the process of producing substantially oxide free copper in powder form from copper salts by reacting an acidic aqueous solution which contains said copper salts with a reducing gas at elevated temperature and pressure to precipitate metallic copper, the improvement, which comprises providing in said aqueous solution a finite amount of an addition agent selected from the group consisting of polymeric polyamine compounds having amino group linked by alkyl groups having 2 to 4 carbon atoms.

2. The process according to claim 1 in which said addition agent is a highly branched polyethylenimine polymer having a molecular weight in the range of 40,000 to about 100,000.

3. The process according to claim 2 in which the addition agent is present in the system subjected to treatment in amount between about 100 and about 200 ppm.

4. The process according to claim 1 in which said solution is an acid copper sulphate solution.

5. The process according to claim 1 wherein said solution is an acid copper sulphate solution which also contains ammonium sulphate.

6. The process according to claim 1 in which said reduction reaction is carried out on a continuous basis with preheated copper bearing aqueous solution being fed into a reaction vessel and copper powder and treated solution being discharged from said reaction vessel whilst conditions for reduction of copper from said solution are continuously maintained in said reaction vessel.

* * * * *